L. S. CHICHESTER.
Cotton Gin.
No. 16,565.
Patented Feb. 3, 1857.
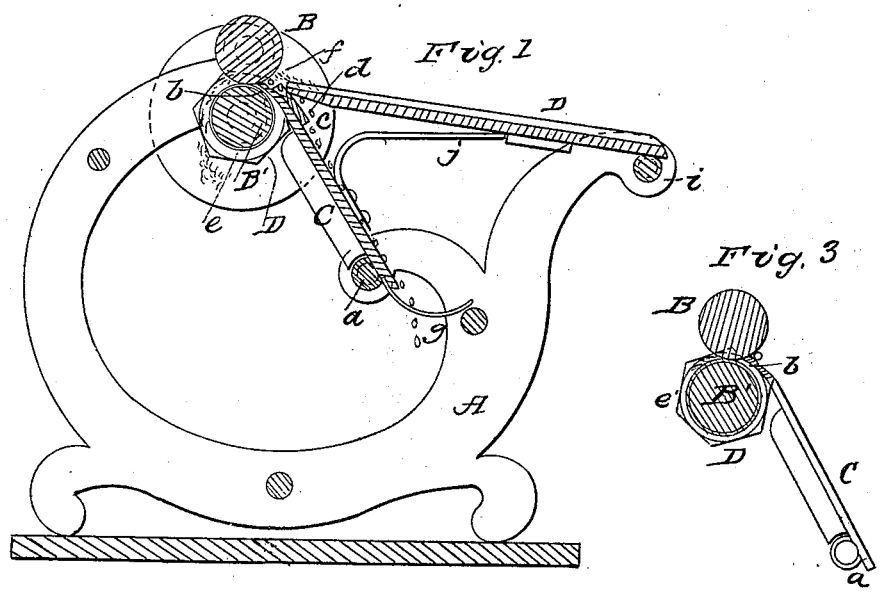
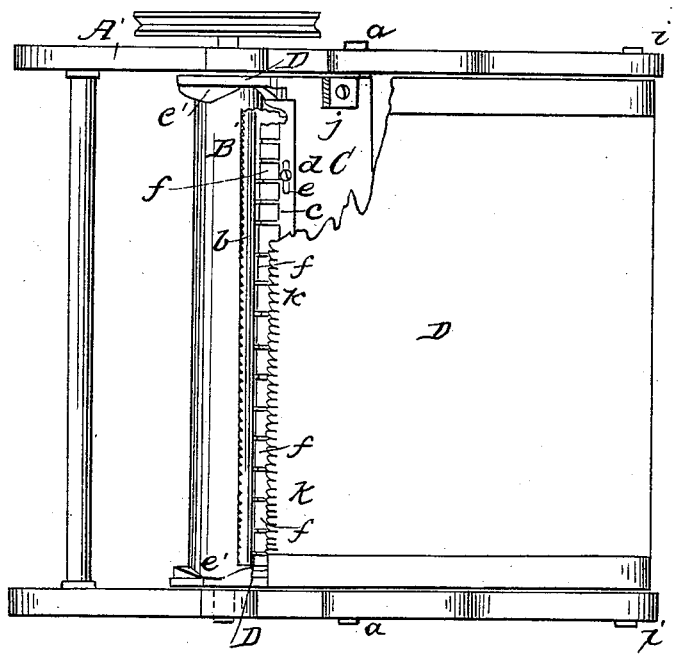

UNITED STATES PATENT OFFICE.

LEWIS S. CHICHESTER, OF NEW YORK, ASSIGNOR TO HENRY G. EVANS.

IMPROVEMENT IN COTTON-GINS.

Specification forming part of Letters Patent No. 16,565, dated February 3, 1857.

*To all whom it may concern:*

Be it known that I, LEWIS S. CHICHESTER, the city, county, and State of New York, have invented certain new and useful Improvements in Roller Cotton-Gins; and I do hereby declare that the following is a full, clear, and exact description of the same, reference being had to the annexed drawings, making a part of this specification, in which—

Figure 1 is a longitudinal vertical section of my improvement, the plane of section being through the center. Fig. 2 is a plan or top view of the same, a portion of the feed-board being broken away and the upper roller removed. Fig. 3 is an enlarged transverse section of the rollers and adjoining parts.

Similar letters of reference indicate corresponding parts in the several figures.

This invention relates to certain improvements in what is known as the "roller-gin" for ginning long-staple or sea-island cotton. The roller-gins now in use are formed of two wooden rollers, of small diameter, one inch or less, and eight or ten inches long, placed in contact, one above the other in the same plane, and revolved with equal speed in opposite directions. The rollers are worked in single pairs by the foot, or a number of pairs are connected together and driven by horse or other power. The diameter of these rollers being small, the curves or the angle formed at their line of contact is sufficiently obtuse to detain or press off the seeds, preventing them passing between the rollers if the cotton is fed to them in small quantities, while the bite of the rollers in motion draws off the cotton which passes between the rollers. The process of ginning by these machines is a very slow one, as the cotton must necessarily be fed evenly and in small quantities to the rollers in order to prevent an accumulation of seed near the bite of the rollers, and consequently the crushing of the seed.

The object of my improvement is to increase the capacity of the roller-gin; and the invention consists in the employment or use of a feeder-plate, of suitable width, resting and working on centers below, and extending upward nearly to the line of contact of the two rollers, the upper end of the plate having a small curved ledge upon it, armed at its front edge with small teeth, and having a vibrating motion toward and from the bite of the rollers for the purpose of detaching the seeds from the cotton, and also assisting or feeding the cotton to the bite of the rollers.

My invention further consists in using, in connection with the feeder-plate, a plate or comb provided with teeth, and having an endwise or lateral motion outside of and just below the bite of the rollers, together with the motion—forward and back—in common with the feeder-plate, by which the seeds are rippled out and thrown off from the cotton as the cotton is stripped from them by the action of the rollers and ledge on the feeder-plate.

To enable those skilled in the art to fully understand and construct my invention, I will proceed to describe it.

A represents a framing, which may be constructed of either wood or metal, and of any proper form to support the working parts.

B B' represent two rollers, placed in the framing A—one above the other and in the same plane—the two rollers being in contact, the upper one, B, receiving its motion from the lower one, B', and consequently rotating in a reverse direction to it.

C represents a plate, the lower end of which rests on centers *a a*, fitted in bearings in the frame A below the rollers. The upper edge of this plate has a narrow ledge, *b*, formed on it, the lower or under surface of which is of concave form, and is placed near or at the bite formed by the point of contact of the two rollers, as is plainly shown in Fig. 3. The outer or front edge of the ledge *b* is serrated or armed with fine teeth, as clearly shown in Fig. 2. The centers *a a* of the plate C are so placed in the frame that the plate has an inclined position, as shown in Fig. 1. The upper surface of the ledge *b* is of convex form, as shown plainly in Figs. 1 and 3.

On each journal of the lower roller, B', a cam, D, is placed. These cams, as the rollers rotate, act against the plate C, the upper end of which rests upon them, and are so formed that they give, in connection with a spring, *g*, which is at the lower end of said plate, a vibrating motion to the plate, the ledge *b* being moved toward and from the bite of the two rollers.

To the upper part of the plate C, on its outer side and just below the ledge *b*, a plate, *c*, is attached by screws $d$, said screws passing through oblong slots $e$ in the plate. The inner side $e'$ of each cam D is made with an irregular surface or of cam form, said surfaces acting against the ends of the plate $c$, and giving it an endwise or lateral reciprocating motion. The upper end of the plate $c$ is provided with teeth $f$, which project upward a suitable distance and terminate in points.

D represents the feed-board of usual construction. The outer end of this board rests on centers $i$ $i$, which are fitted in the upper end of the frame A, and at about its center rests upon springs $j$, attached to the plate C. The front end of the board D is serrated or armed with teeth $k$.

The operation is as follows: Motion is given to the lower roller, B', in any proper manner, and the upper roller, B, in consequence of being in contact with the lower one and receiving motion from it, rotates in a reverse direction. The cotton is placed on the feed-board D, and fed by hand toward the rollers B B'. The ledge $b$, as it moves outward or back from the bite, pinches or compresses the seeds (shown in red, Figs. 1 and 3) between its upper surface and the face of the upper roller, B, and the seeds are thereby detached or separated from the fiber, and as the ledge $b$ moves toward the bite its teeth catch or grasp the fibers and carry them to the bite of the two rollers, after the seeds are detached from it. The ledge $b$, extending along the bite of the rollers, forms an angle with the upper roller so obtuse as entirely to prevent the crushing of the seeds, and the endwise or lateral motion of the plate $c$, together with the forward and backward motion of both the plate $c$ and ledge $b$, effectually ripple out and throw off the seeds from the cotton as fast as the cotton is stripped from them by the action of the rollers and ledge.

This invention increases the capacity of the roller-gin at least fourfold, and converts a rude and imperfect apparatus into an effective machine.

A patent was formerly granted to me for an improved roller-gin, in which rollers having an intermittent contact were used, in connection with a guard-plate made slightly corrugated on the outer surface, near the upper edge, for the purpose of allowing the cotton to pass more freely to the bite of the rollers; and this plate was also made to vibrate with an endwise or lateral motion, for the purpose of moving the seeds, and to assist in working off the cotton; but this was found to chafe and twist the fibers, the corrugated edge of the guard-plate acting transversely upon the fibers while being drawn in by the rollers. The action of this guard-plate, which was placed near the bite of the rollers, was such that the cotton was acted upon near the bite and when firmly grasped in it; consequently, the action of the guard-plate served to strain the fiber and cut or chafe it as the guard-plate acted upon or against the seed pressed upon the guard-plate by the upper roller; but in my improvement the toothed plate $c$ acts upon the mass of cotton, and ripples out the side after the seed is detached from the mass by the backward movement of the ledge $b$, thereby obviating the objection of the guard-plate described in my former patent.

Having thus described my invention, what I claim as new, and desire to secure by Letters Patent, is—

1. The employment or use of the vibrating feeder-plate C, having a movement toward and from the bite of the rollers, and provided with the curved ledge $b$ at its upper end, the said ledge being serrated or provided with teeth, and placed at or near the bite of the rollers, substantially as described, for the purpose set forth.

2. The feeder-plate C, with ledge $b$ attached, in combination with the plate or comb $c$, the above parts being arranged and operating conjointly as shown, for the purpose described.

LEWIS S. CHICHESTER.

Witnesses:
W. TUSCH,
S. F. COHEN.